(12) United States Patent
Andrews et al.

(10) Patent No.: US 6,191,209 B1
(45) Date of Patent: Feb. 20, 2001

(54) POLYESTER COMPOSITIONS OF LOW RESIDUAL ALDEHYDE CONTENT

(75) Inventors: Stephen Andrews, New Fairfield, CT (US); Dario Lazzari, Bologna (IT); Paul Odorisio, Leonia, NJ (US); Dirk Simon, Mutterstadt (DE)

(73) Assignee: Ciba Specialty Chemicals Corporation, Tarrytown, NY (US)

( * ) Notice: Under 35 U.S.C. 154(b), the term of this patent shall be extended for 7 days.

(21) Appl. No.: 09/603,505

(22) Filed: Jun. 26, 2000

Related U.S. Application Data

(60) Provisional application No. 60/141,663, filed on Jun. 30, 1999.

(51) Int. Cl.[7] ................................ C08J 3/20; C08F 20/00
(52) U.S. Cl. ..................... 524/502; 528/190; 528/193; 528/194; 528/298; 528/300; 528/301; 528/302; 528/307; 528/308; 528/308.6; 525/437; 524/503; 524/803
(58) Field of Search ..................... 528/190, 193, 528/194, 298, 300, 301, 302, 307, 308, 308.6; 525/437; 524/502, 503, 803

(56) References Cited

U.S. PATENT DOCUMENTS

| | | | |
|---|---|---|---|
| 4,361,681 | * 11/1982 | Bernhardt | 525/444 |
| 4,837,115 | * 6/1989 | Igarashi et al. | 428/36.92 |
| 5,258,233 | * 11/1993 | Mills et al. | 428/480 |
| 5,266,413 | * 11/1993 | Mills et al. | 428/480 |
| 5,340,884 | * 8/1994 | Mills et al. | 125/420 |
| 5,459,224 | * 10/1995 | Pruett et al. | 528/192 |
| 5,648,032 | * 7/1997 | Nelson et al. | 264/101 |
| 5,650,469 | * 7/1997 | Long et al. | 525/425 |
| 5,656,221 | * 8/1997 | Schumann et al. | 264/85 |
| 5,856,385 | 1/1999 | Mehrer et al. | 524/108 |

FOREIGN PATENT DOCUMENTS

| | | |
|---|---|---|
| 0191701 | * 2/1986 | (EP) . |
| 0714832 | * 6/1996 | (EP) . |
| 0826713 | 3/1998 | (EP) . |
| 62-257959 | 11/1987 | (JP) . |
| 93/20147 | * 10/1993 | (WO) . |
| 93/23474 | * 11/1993 | (WO) . |
| 98/07786 | * 2/1998 | (WO) . |
| 98/39388 | * 9/1998 | (WO) . |

OTHER PUBLICATIONS

Abstract for JP 62257959, 11/87.

* cited by examiner

Primary Examiner—Samuel A. Acquah
(74) Attorney, Agent, or Firm—Luther A. R. Hall

(57) ABSTRACT

A mixture of a polyester, such as poly(ethylene terephthalate) PET, and a second polymer which is poly (vinyl alcohol) or an ethylene/vinyl alcohol copolymer when extrusion compounded exhibits a lower residual acetaldehyde content than does PET alone when similarly treated. The invention pertains to any polyester used in the manufacture of bottles or containers which in turn are used to store consumer materials, especially food, beverages and most especially water.

15 Claims, No Drawings

POLYESTER COMPOSITIONS OF LOW RESIDUAL ALDEHYDE CONTENT

This application claims benefit of Provisional application 60/141,663, filed Jun. 30, 1999.

A mixture of a polyester, such as poly(ethylene terephthalate) PET, and a second polymer which is poly (vinyl alcohol) or an ethylene/vinyl alcohol copolymer when extrusion compounded exhibits a lower residual acetaldehyde content than does PET alone when similarly treated. The invention pertains to any polyester used in the manufacture of bottles or containers which in turn are used to store consumer materials, especially food, beverages and most especially water.

BACKGROUND OF THE INVENTION

U.S. Pat. No. 4,361,681 teaches that polyester containing anhydride end-cap agents have a reduced acetaldehyde generation rate.

U.S. Pat. No. 5,459,224 discloses polyesters having 4-oxybenzylidene end-cap agents to impart improved weatherability and photostability, but no mention is made as to evolution of acetaldehyde. However, it is indicated that such polyesters are suitable for food and beverage packaging.

Polyesters can be synthesized by a number of routes known in the art using a variety of catalyst systems. EP 826,713 A1 teaches that lower levels of acetaldehyde occur during copolymerization of PET when a phosphite such as bis(2,4-di-tert-butylphenyl)pentaerythritol phosphite is present during the polymerization.

U.S. Pat. Nos. 4,837,115; 5,258,233; 5,266,413; 5,340,884; 5,648,032 and 5,650,469; and WO 93/20147 A1; WO 93/23474 A1; WO 98/07786 and WO 98/39388 teach the use of polyamides as a means of reducing the concentration of acetaldehyde, presumedly via a Schiff-base reaction with the aldehyde, which is reversible in the presence of water.

EP application 191,701A2 describes biaxially oriented container having excellent barrier properties said container comprising a blend of a poly(ethylene terephthalate) resin and an ethylene/vinyl alcohol copolymer resin. This reference is focused on improved gas barrier properties and is silent as to any reduction of acetaldehyde content.

Japanese Sho 62-257959 describes biaxially stretched vessels built of synthetic resin consisting of poly(ethylene terephthalate) blended with a copolymer of a polyamide, or blended with ethylene/vinyl alcohol copolymer at a weight fraction of 0.1 to 15 percent. The examples are limited to a single EVOH polymer (EVEL® G110, Kuraray Co.). It is taught that a lower level of acetaldehyde occurs when the EVOH polymer is present.

When ethylene/vinyl alcohol copolymer is added to a polyester even at a level of 0.1% by weight (1000 ppm), the resulting blend when extruded into film or plaque exhibits unacceptable haze usually seen as a graying effect. This haze is perceptible and severely limits the amount of ethylene/vinyl alcohol copolymer which can be used for the purpose of reducing the level of acetaldehyde. The instant invention is distinguished from the prior art by virtue of using lesser amounts (50–750 ppm) of ethylene/vinyl alcohol copolymer which do not produce unacceptable haze, but still provide significant reduction in the level of acetaldehyde formed during processing.

European application 714,832A1 teaches a method of manufacturing a container comprising poly(ethylene terephthalate), polycarbonate or PEN polyester with an additive in the bottle wall which binds acetaldehyde. The additive is generally described as a polyamide.

U.S. Pat. No. 5,656,221 describes a process of producing polyester with reduced acetaldehyde concentration using certain catalysts or inert gas conditions or by adding an amide compound. These include commercial polyamides or long chain aliphatic amide compounds.

U.S. Pat. No. 5,856,385 teaches the use of polyamide or amide-wax to reduce the level of acetaldehyde which occurs when sorbitol-based clarifying agent is heated in polyolefins.

The invention is useful for any polyester where aldehydic compounds, especially acetaldehyde, are formed or evolved during thermal processing of said polyester. Thermal processing of PET includes the synthesis of PET, thermal exposure during solid state polymerization (SSP), any injection molding, injection-blow molding or stretch-blow molding used in the manufacture of preforms, parisons or bottles and containers, or extrusion of film, or during any melt processing of PET above its glass transition temperature and below its decomposition temperature.

The instant invention provides for a lower amount of contaminants (e.g. aldehydes) in PET water bottles thus providing for improved taste or flavor in bottled water or other bottled beverages in said PET containers. The reduction in the amount of acetaldehyde is highly beneficial in this respect. Acetaldehyde is known as a decomposition product of polyesters such as PET. The acetaldehyde imparts an undesirable taste or flavor to bottled water stored in PET bottles. It has been a long sought objective of the industry to reduce the level of acetaldehyde which migrates out of the PET bottle walls into the water or other beverage stored therein. A number of engineering or design changes to extruders, injection molding machines for preforms and bottle making machinery have been made to minimize formation of acetaldehyde when poly(ethylene terephthalate) PET is processed. Modification to the PET composition itself have been made to lower its melting point or its melt viscosity in order to allow less severe thermal or mechanical damage when PET is processed into preforms or bottles.

DETAILED DISCLOSURE

The instant invention pertains to a polyester composition, stabilized against the formation of aldehydic contaminants during melt processing of said polyester, which comprises (a) a polyester, and (b) an effective stabilizing amount of a second polymer which is poly(vinyl alcohol) or an ethylene/vinyl alcohol copolymer.

The polyester of component (a) is 99.925–99.995% by weight of the stabilized composition; and the second polymer of component (b) is 0.075 to 0.005% by weight of the stabilized composition.

Preferably, component (a) is 99.95–99.99% by weight; and component (b) is 0.05 to 0.01% by weight based on the stabilized composition; most preferably component (a) is 99.95–99.98% by weight; and component (b) is 0.05 to 0.02% by weight based on the stabilized composition.

The polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof.

Especially preferred are terephthalic acid and 2,6-naphthalene dicarboxylic acid.

The diol or glycol portion of the polyester of component (a) are derived from the generic formula HO—R—OH where R is an aliphatic, cycloaliphatic or aromatic moiety of 2 to 18 carbon atoms.

Preferably such diols or glycols are ethylene glycol, diethylene glycol, triethylene glycol, propane-1,3-diol, butane-1,4-diol, pentane-1,5-diol, hexane-1,6-diol, 1,4-cyclohexanedimethanol, 3-methylpentane-2,4-diol, 2-methylpentane1,4-diol, 2,2-diethylpropane-1,3-diol, 1,4-di-(hydroxyethoxy)benzene, 2,2-bis(4-hydroxycyclohexyl)propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

Most preferably, the diol is ethylene glycol.

The polyester of component (a) is preferably poly(ethylene terephthalate) PET or poly(ethylene 2,6-naphthalene-2,6-dicarboxylate); most preferably poly(ethylene terephthalate).

It is also contemplated that the polyester of component (a) can also be a blend of polyesters or copolyesters including components mentioned above.

It is contemplated that the polyester of component (a) can be virgin polymer or alternatively polymer recyclate. Additionally, it is possible to prepare a concentrate of the polymer described for component (b) in a polyester carrier resin which is then combined with the polyester of component (a) to obtain the stabilized compositions described previously.

The second polymer of component (b) is poly(vinyl alcohol) or an ethylene/vinyl alcohol copolymer.

Preferably, the second polymer is an ethylene/vinyl alcohol copolymer where the mole ratio of ethylene to vinyl alcohol is 99:1 to 1:99. Especially preferred, is the ethylene/vinyl alcohol copolymer where the mole ratio of ethylene to vinyl alcohol is 50:50 to 20:80.

The ethylene/vinyl alcohol copolymers of component (b) can be random or block copolymers.

The instant invention also pertains to a process for preventing the formation of aldehydic contaminants during melt process of a polyester which comprises incorporating into said polyester an effective stabilizing amount of a second polymer which is poly(vinyl alcohol) or an ethylene/vinyl alcohol copolymer.

The instant invention shows that the vinyl alcohol group, especially in combination with one or more copolymerizable vinyl monomers, gives results which are useful in supplying a market need. While the poly(vinyl alcohol) homopolymer provides some reduction in acetaldehyde content in poly(ethylene terephthalate), the poly(vinyl alcohol-ethylene) copolymers provide a much better reduction in acetaldehyde in poly(ethylene terephthalate).

The following examples are for illustrative purposes only and are not to be construed to limit the scope of the instant invention in any manner whatsoever.

General—PET bottle grade pellets are subjected to extrusion compounding to simulate the heat history which PET experiences when thermally injection molded into bottle preforms and subsequently stretch-blow molded into bottles. The efficacy of an additive added to reduce the formation of acetaldehyde is determined by quantitative analysis using thermal desorption GC-MS. An unstabilized PET is extruded each day to provide a control polymer for measuring acetaldehyde formation.

Extrusion—PET is predried in vacuo under nitrogen at an oven temperature of about 70° C. to a moisture level of about 30 ppm which is verified on a Mitsubishi VA-O6 moisturemeter. A Leistritz 18 mm or 27 mm corotating, non-intermeshing twin screw extruder is configured as follows: set temps=throat (220–230° C.), zones and die (270° C.), actual extrudate melt temperature is 275–280° C., screw at 100–110 rpm, hopper feeder=10–15 ppm.

PET Pellet Color—Yellowness Index (YI), and L*, a*, b* by ASTM D1925, D65 10 degm specular included, measured on PET pellets using a DCI spectrophotometer.

Acetaldehyde Analysis—The concentration of acetaldehyde in PET is quantitatively determined using a thermal desorption GC-MS method adapted from B. Nijassen et al., Packaging Technology and Science, 9, 175 (1996); S. Yong Lee, SPE ANTEC 1997, pp 857–861; and M. Dong et al., J. Chromatographic Science, 18, 242 (1980). A general example follows below:

The PET samples are analyzed, in duplicate, by weighing 250 mg of powdered PET pellets (cryogenically pulverized) in a 5 mL crimp sealed headspace vial. The sample vial is heated at 120° C. for one hour in a Tekmar model 5000 static headspace analyzer. The headspace gas (5 cc) is then transferred via a heated transfer line to a Fisons MD-800 GC-MS system for SIR detection of the acetaldehyde. The acetaldehyde is detected by monitoring its fragment ions of 29 and 44 m/e. The Total Ion Current (TIC) of the GC-MS is also monitored in the retention time region of 4–8 minutes. By doing this the presence of acetaldehyde in the samples is confirmed by three different detectors. By using a known acetaldehyde value for PET, the ratio of peak areas for the known PET resin and for the experimental PET resin blends are compared and the amount of acetaldehyde in the experimental blend can be obtained.

EXAMPLE 1

Unstabilized commercial PET (CLEARTUF® 7207, Shell) is used as a control PET. Several additives listed below demonstrate a significant reduction in the amount of acetaldehyde (AA) versus the amount seen when unstabilized PET is extrusion compounded. The % AA reduction is the amount less compared to the amount of AA in the control. The total ion current (TIC) data run in triplicate for the control PET has a standard deviation of σ=0.35.

| Sample* | Additive ppm | % AA Reduction | TIC ave ppm AA | Pellet Color YI | b* |
|---|---|---|---|---|---|
| Control | none | — | 6.8 | 14.4 | 3.4 |
| A | 400 | 31 | 4.7 | 18.5 | 5.7 |
| B | 400 | 38 | 4.2 | 10.1 | 1.8 |
| B | 1600 | 38 | 4.2 | 10.1 | 2.0 |
| B | 4000 | 35 | 4.4 | 8.7 | 1.5 |
| B | 10000 | 42 | 3.9 | 10.4 | 2.5 |

*A additive is poly(vinyl alcohol), PVA.
B additive is ethylene/vinyl alcohol copolymer, 40% ethylene.

The use of the ethylene/vinyl alcohol copolymer results in the greatest reduction of acetaldehyde versus the control.

EXAMPLE 2

In another series of tests following the general procedure of Example 1, three ethylene/vinyl alcohol copolymers with different mole percentages of vinyl alcohol are seen to be generally effective in reducing the level of acetaldehyde in PET after one extrusion compounding operation.

| Sample* | Additive wgt % | % AA Reduction | TIC ave ppm AA | Pellet Color YI | b* |
|---|---|---|---|---|---|
| Control | none | — | 3.6 | 15.1 | 4.1 |
| C | 0.16 | none | 3.9 | 15.5 | 4.2 |
| C | 0.40 | 16 | 3.0 | 11.8 | 2.8 |
| C | 1.0 | 11 | 3.2 | 12.2 | 3.4 |
| D | 0.40 | 19 | 2.9 | 13.1 | 3.7 |
| D | 1.0 | 38 | 2.2 | 13.0 | 3.9 |
| E | 0.40 | 28 | 2.6 | 14.3 | 4.4 |

*C additive is ethylene/vinyl alcohol copolymer, 38% ethylene.
D additive is ethylene/vinyl alcohol copolymer, 32% ethylene.
E additive is ethylene/vinyl alcohol copolymer, 27% ethylene.

The exact nature of the ethylene/vinyl alcohol copolymer determines the level of effectiveness of the additive.

EXAMPLE 3

Unstabilized commercial poly(ethylene terephthalate), (EASTAPAK® 9921W, Eastman) is used as a control polyethylene terephthlate). Bottle preforms of approximately 54 gram weight are produced on a commercial scale preform molding machine (5,000 preforms/hour; $T_{max}$ 290° C.). Acetaldehyde is measured on ground polymer powder obtained from the preforms as described in Example 1. Powder containing several additives listed below demonstrate a significant reduction in the amount of acetaldehyde (AA) versus the amount seen when unstabilized poly (ethylene terephthalate) is injection molded into preforms.

The % AA reduction is the amount less compared to the amount AA observed for the control sample.

| Sample* | Additive wt % | % AA Reduction | GC ave. ppm AA |
|---|---|---|---|
| control | none | — | 5.6 |
| E | 0.2 | 41 | 3.3 |
| E | 0.5 | 54 | 2.6 |
| E | 0.5** | 55 | 2.5 |
| E | 1.0 | 66 | 1.9 |

*E is ethylene/vinyl alcohol copolymer, 27% ethylene
**the additive E is added as a masterbatch and let down to a final 0.5% level in the poly(ethylene terephthalate) preform.

The use of the ethylene/vinyl alcohol copolymer results in a substantial reduction of acetaldehyde level versus the control.

EXAMPLE 4

Haze of Injection Molded Plaques

The extrusion compounding procedure of Example 1 is used to prepare compounded blends of PET with an ethylene/vinyl alcohol copolymer with 27% by weight ethylene as component (b). Both unstabilized commercial PET (CLEARTUF® 7201 Shell) and the compounded PET blends are injection molded into 2"×2"×60 mil plaques using a BOY 50M Injection Molder at a die temperature of 550° F. (288° C.). Plaques are obtained for the PET without any stabilizer as control and with 0.05% and with 0.10% of additive E present. A BYK-Gardner Haze meter is used to measure haze.

The haze values of the plaques (quadruple values) are obtained and averaged, and visual observation of the plaques are also noted as seen in the table below.

| Sample* | Haze values | | | | |
|---|---|---|---|---|---|
| | 1 | 2 | 3 | 4 | ave. |
| control PET | 2.3 | 1.8 | 2.0 | 1.8 | 1.975 |
| E 500 ppm | 3.7 | 3.8 | 3.8 | 3.6 | 3.725 |
| E 1000 ppm | 6.0 | 5.9 | 5.8 | 5.6 | 5.825 |

*E is ethylene/vinyl alcohol copolymer, 27% ethylene.

The control plaques are clear and without any discernible haze.

The plaques containing 500 ppm (0.05%) by weight of E are clear with an almost indiscernible bluish tint.

The plaques containing 1000 ppm (0.1%) by weight of E have a smoky appearance which is unacceptable. The pellets used in this case feel waxy and adjustments are needed to the injection process (increase screw speed and reduce pressure) to obtain the plaques.

These data indicate that the 0.1% ethylene/vinyl alcohol copolymer level described by Japanese Sho 62-257959, while reducing the level of acetaldehyde, led to an unacceptable level of haze in the stabilized PET composition.

What is claimed is:

1. A polyester composition, stabilized against the formation of aldehydic contaminants during melt processing of said polyester, which comprises
    (a) a polyester, and
    (b) an effective stabilizing amount of a second polymer which is poly(vinyl alcohol) or an ethylene/vinyl alcohol copolymer, and
    wherein the polyester of component (a) is 99.925–99.995% by weight of the stabilized composition; and the second polymer of component (b) is 0.075 to 0.005% by weight of the stabilized composition.

2. A composition according to claim 1 wherein component (a) is 99.95–99.99% by weight of the stabilized composition; and component (b) is 0.05 to 0.01% by weight of the stabilized composition.

3. A composition according to claim 2 wherein component (a) is 99.95–99.98% by weight of the stabilized composition; and component (b) is 0.05 to 0.02% by weight of the stabilized composition.

4. A composition according to claim 1 wherein the polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

5. A composition according to claim 4 wherein the dicarboxylic acid is terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof.

6. A composition according to claim 5 wherein the dicarboxylic acid is terephthalic acid or 2,6-naphthalene dicarboxylic acid.

7. A composition according to claim 1 wherein the diol portion of the polyester of component (a) is derived from the generic formula HO—R—OH where R is an aliphatic, cycloaliphatic or aromatic moiety of 2 to 18 carbon atoms.

8. A composition according to claim 7 wherein the diol is ethylene glycol, diethylene glycol, triethylene glycol, propane-1,3-diol, butane-1,4-diol, pentane-1,5-diol, hexane-1,6-diol, 1,4-cyclohexanedimethanol, 3-methylpentane-2,4-diol, 2-methylpentane-1,4-diol, 2,2-diethylpropane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl) propane, 2,2-bis-(4-hydroxypropoxyphenyl)ethane and mixtures thereof.

9. A composition according to claim 8 wherein the diol is ethylene glycol.

10. A composition according to claim 1 wherein the polyester of component (a) is poly(ethylene terephthalate) PET or poly(ethylene 2,6-naphthalene-2,6-dicarboxylate).

11. A composition according to claim 10 wherein the polyester is poly(ethylene terephthalate).

12. A composition according to claim 1 wherein the second polymer of component (b) is an ethylene/vinyl alcohol copolymer.

13. A composition according to claim 12 wherein the second polymer is an ethylene/vinyl alcohol copolymer where the mole ratio of ethylene to vinyl alcohol is 99:1 to 1:99.

14. A composition according to claim 13 where in the ethylene/vinyl alcohol copolymer the mole ratio of ethylene to vinyl alcohol is 50:50 to 20:80.

15. A process for preventing the formation of aldehydic contaminants during melt processing of a polyester which comprises incorporating into said polyester 0.075 to 0.005% by weight of a second polymer which is poly(vinyl alcohol) or an ethylene/vinyl alcohol copolymer.

* * * * *